Feb. 21, 1950 R. M. SMITH 2,498,381
RADIO ECHO DISTANCE MEASURING DEVICE
Filed April 12, 1939 2 Sheets-Sheet 1

Inventor
Rogers M. Smith
By
Attorney

Inventor
Rogers M. Smith

Patented Feb. 21, 1950

2,498,381

UNITED STATES PATENT OFFICE 2,498,381

RADIO ECHO DISTANCE MEASURING DEVICE

Rogers M. Smith, Merchantville, N. J., assignor to Radio Corporation of America, a corporation of Delaware Application April 12, 1939, Serial No. 267,475

6 Claims. (Cl. 343—5)

This invention relates to measuring devices in which distance is determined as a function of the time required to transmit a radio wave toward an object and to receive the wave after reflection from the object whose distance is to be measured. The invention more specifically is a device of the character described in which the receiver sensitivity is cyclically varied so that the device is more sensitive for greater distances and less sensitive for shorter measurements.

The radio pulses, which are initially radiated to set up the echo or reflection, represent substantial amounts of energy. If the receiver is extremely sensitive, it becomes very difficult to shield it from the deleterious effects of the initial pulse. Furthermore the initial pulse tends to block or paralyze the receiver and make it relatively useless for measuring extremely short intervals or distances. It has been suggested that the initial pulse be balanced by an equal and opposite pulse, but it is extremely difficult to obtain and to maintain the required nicety of balance. The more sensitive the receiver, the more difficult it becomes to eliminate the initial pulses and their blocking effect.

One of the objects of this invention is to provide means whereby the effect of the initial pulse of a radio echo device upon the receiver is diminished. Another object is in the provision of means for cyclically varying the sensitivity of an echo receiver. An additional object is to provide means for and a method of varying the sensitivity of a receiver as a function of time. A further object is to provide means for and a method of increasing momentarily the sensitivity of a receiver.

Figure 1:
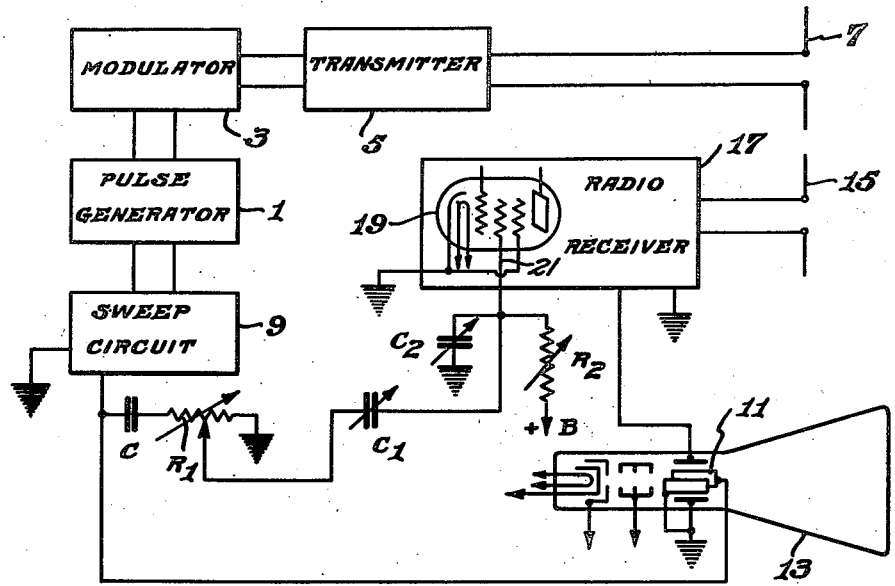
Figure 3:
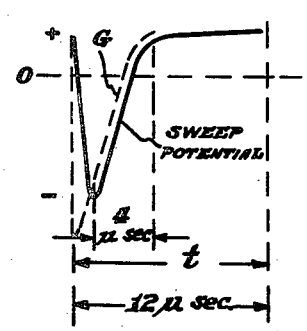
Figure 4:
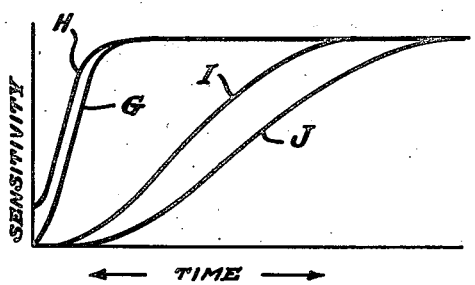
Figure 5:
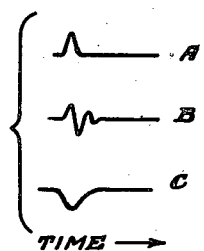
Figure 2:
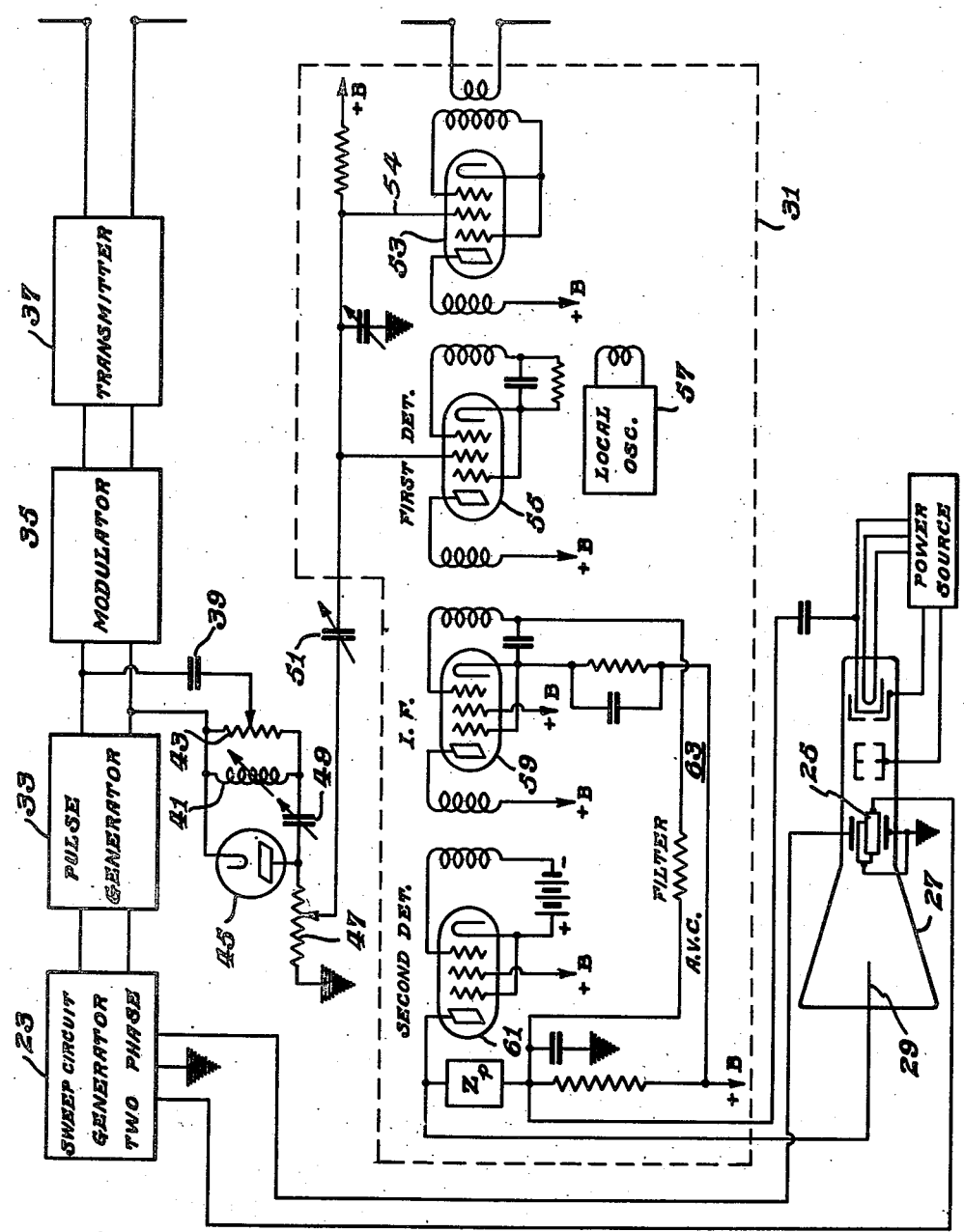

The invention will be described by reference to the accompanying drawings in which Figure 1 is a schematic diagram of one embodiment of the invention; Figure 2 is a schematic diagram of a modification; and Figures 3, 4 and 5 are graphs descriptive of the operation of the device.

One type of distance measuring system is shown in Fig. 1, in which the transmitter is represented as a pulse generator 1, a modulation 3 and a high frequency generator 5. The high frequency generator 5 is coupled to a dipole antenna 7. The pulse generator is connected to a sweep circuit generator 9. The output of the sweep circuit generator is applied to the horizontal deflecting elements 11 of a cathode ray tube 13. The receiving system includes a dipole antenna 15 and a radio receiver 17 whose output is connected to the vertical deflecting elements of the cathode ray tube.

The radio receiver may include a superheterodyne, radio frequency or like circuit employing suitable vacuum tubes 19. If a screen grid type of amplifier tube is used, an automatic cyclic control potential may be applied to the screen grid 21 by connecting the screen through a capacitor C1 to a potentiometer R1, which is serially connected through a capacitor C to the output of the sweep circuit generator. The screen is also connected through a capacitor C2 to ground, and through a resistor R2 to a positive bias potential source.

The operation of the circuits is essentially as follows: The pulse generator develops current pulses of the order of 0.1 mu second duration. The sweep generator, synchronized with the pulses, establishes potentials of the wave form illustrated in Fig. 3. The outgoing pulse occurs at substantially the bottom of the curve and the rising portion to the right indicates the useful range of sweep potential which lasts about one-third of the total cycle or four mu seconds for a distance indicator having a range of 50 to 2000 feet. The sweep potential is applied to the cathode ray to cause horizontal movement. The sweep potential is also applied to the screen grid so that the tube 19 is practically blocked at the start of the sweep. As the sweep potential becomes less negative, the gain or amplification of the tube 19 is made to increase at a rate, which, by way of example, is made to follow the sweep as shown by curve G.

In the meantime, the initial pulse has been applied to the modulator 3 which modulates or keys the high frequency generator 5. The generator thus keyed establishes a pulse of high frequency energy in the antenna 7 from which waves are radiated. Some of these waves reach the receiving antenna 15, which may be positioned to minimize the direct pickup. The directly received energy is applied to the receiver 17 at the instant when the tube 19 is practically blocked. Wave energy which is reflected from nearby objects will be relatively great and since the tube 19 is made only slightly responsive, this energy will be received but passed in amounts which will not paralyze the receiver. As the reflections travel greater distances and grow less in strength, the receiver is made automatically more sensitive. In practice the positive bias has been found to increase the receiver gain with respect to the gain at a zero or negative bias.

The receiver sensitivity curve G of Figs. 3 and 4 may be modified by the choice of resistor R1, R2 and capacitor C1, C2 values. The graphs G to J of Fig. 4 were obtained by using the following constants:

| Graph | C1 in μf. | C2 in μμf. | R1 in Ohms | R2 in Ohms |
|---|---|---|---|---|
| G | .1 | 10–30 | 4,500 | 39,000 |
| H | 330×10⁻⁶ | 10–30 | 4,500 | 39,000 |
| I | .1 | 100 | 4,500 | 39,000 |
| J | .1 | 330 | 4,500 | 39,000 |

It should be understood that the inherent capacities of the system form a part of the total capacity and that numerous combinations of capacity and resistance may be used to obtain the desired sensitivity versus time characteristic. Furthermore, the above curves are representative of conditions used in circuits adapted to measure distances from 50 to 2000 feet.

The foregoing describes a device in which distance is measured along a horizontal scale. In some applications, for example, aircraft altimeters, a circular scale with radial deflections may be desired. In such arrangements the sweep circuit applies potentials in quadrature to the cathode ray deflecting elements to thereby establish a circular sweep. The potentials, corresponding to the received reflections, are applied to a control electrode to deflect radially the cathode ray circular trace. If the circular sweep is used, the potentials for the cyclic sensitivity control are derived from the pulse generator by an arrangement shown in Fig. 2.

The sweep circuit generator 23 is connected to the pairs of deflecting electrodes 25 of the cathode ray tube 27. The radial deflection electrode 29 of the cathode ray tube is connected to the output of the radio receiver 31. The sweep generator, pulse generator 33, modulator 35 and transmitter 37 are connected as previously described. The output of the pulse generator is connected, through a capacitor 39, to an inductor 41 which may be shunted by a resistor 43. The upper junction of the inductor and resistor is connected to the cathode of a rectifier 45. The anode of the rectifier is connected through a potentiometer 47 to ground, and through a capacitor 49 to the lower junction of the inductor and resistor. The movable contact of the potentiometer is coupled through a capacitor 51 to the screen grid 54 of an amplifier tube 53 in the receiver 31.

The operation of the rectifier 45 is illustrated by the curves A, B, and C of Fig. 5. The pulse is represented by the peaked wave form of curve A. The pulse shock excites the circuit including inductor 41, resistor 43 and inherent capacities not shown. The shock excited circuit generates an oscillatory current B whose decrement is determined by the Q (ratio of reactance to resistance) of the circuit. The rectifier has a D.-C. output corresponding to the envelope of the oscillatory current as shown by curve C. The rectified currents are applied to the amplifier 53 and first detector 55 to cyclically vary their gain.

In an echo receiver without cyclic sensitivity control, automatic volume control is impractical. This is because the initial transmitted pulse would operate the automatic volume control and thereby diminish the sensitivity of the receiver for reflected pulses. In systems employing the cyclic control of the present invention automatic volume control may be used in the later stages of the receiver. In Fig. 2 the receiver includes a radio frequency amplifier 53, first detector 55, local oscillator 57, intermediate frequency amplifier 59 and final detector 61. The output of the final detector includes an automatic volume control circuit 63 which controls the gain of the intermediate frequency amplifier. The first detector, as well as the radio frequency amplifier, may be controlled by the cyclic control. Preferably only the later stages are controlled by the A. V. C.

The operation of the receiver with both cyclic and automatic sensitivity control is not unlike the operation of the system with the cyclic control only. However, the automatic control is arranged so that its time cycle will hold over from a reflection to the next succeeding reflection and thereby maintain the optimum operating efficiency for any given range. Without the A. V. C. the sensitivity of the later stages of the receiver may exceed that required and thus the receiver is responsive to undesired signals, reflections, transient effects from the transmitter, or the like. The combination of the cyclic and automatic controls tends to decrease the receiver response to the aforementioned deleterious effects.

In a modification of the invention, the first radio frequency tube of the receiver has been arranged so that its grid circuit includes a serially connected resistor and capacitor. The initial pulse of the transmitter applies a high potential to the grid circuit, which charges the capacitor. The charged capacitor not only biases the first tube, but also may be used as the source of A. V. C. for other tubes of the system. The capacitor and resistor values are chosen so that the desired time constant is obtained. The grid may be biased so that pulses of lesser amplitude do not draw grid current.

Thus the invention has been described as a cyclic control for a radio distance measuring system. The cyclic control varies the sensitivity of the receiver as a function of time or distance. The method may be applied to different circuit arrangements. While the invention has been described in conjunction with rectangular, and circular scanning, it should be understood that it may be applied to helical or other types of scanning. Furthermore, automatic volume control may be applied to any system in which the cyclic control is used in the preceding stages. While the invention has been specifically applied to a superheterodyne with a single radio frequency and a single intermediate frequency amplifier, it should be understood that several stages of either type of amplification may be employed and other types of circuits may be used. The method of control is not limited to the specific apparatus which has been chosen by way of illustration.

I claim as my invention:

1. In a radio distance measuring system, a radio transmitter, means including said transmitter for radiating pulses of radio frequency energy whose reflections from an object are measures of the distance of the object, a radio receiver, a cathode ray tube including ray deflection elements connected to said receiver to indicate reception of said reflections, means for generating and applying cathode ray sweep potentials to one of said deflection elements in synchronism with said pulse radiation, means for deriving from said sweep potentials a cyclically varying potential which after the termination of each pulse transmission changes from a comparatively large value to a comparatively small value, and means connecting said last means to said receiver for applying said cyclically varying potentials to said receiver to control its sensitivity so that its sensitivity during the period following termination of a pulse transmission increases as a function of said varying potential.

2. In a system such as described in claim 1 characterized by the fact that said receiver comprises a plurality of stages having at least one stage including said cyclic sensitivity control, an automatic volume control, and means for applying said automatic volume control to said receiver.

3. In a system such as described in claim 1 characterized by the fact that said receiver comprises a plurality of stages having at least one stage including said cyclic sensitivity control, an automatic volume control, and means for applying said automatic volume control to the later stages of said receiver.

4. In a radio distance measuring system, a radio transmitter, means including said transmitter for radiating pulses of radio frequency energy whose reflections from an object are measures of the distance of the object, a radio receiver, a cathode ray tube connected to said receiver to indicate said reflections, means for deriving from said pulses controlling potentials which change in value during the period following the termination of each pulse transmission, and means connecting said potential means to said receiver for applying said controlling potentials to said receiver to cyclically vary its sensitivity in synchronism with the radiation of said pulses so that said sensitivity increases from a low value during said period to a comparatively high value during said period, and wherein said receiver comprises a plurality of stages having at least one stage including said cyclic sensitivity control, an automatic volume control, and means for applying said automatic volume control to said receiver.

5. In a radio distance measuring system, a radio transmitter, means including said transmitter for radiating pulses of radio frequency energy whose reflections from an object are measures of the distance of the object, a radio receiver, a cathode ray tube connected to said receiver to indicate said reflections, means for deriving from said pulses controlling potentials which change in value during the period following the termination of each pulse transmission, and means connecting said potential means to said receiver for applying said controlling potentials to said receiver to cyclically vary its sensitivity in synchronism with the radiation of said pulses so that said sensitivity increases from a low value during said period to a comparatively high value during said period, and wherein said receiver comprises a plurality of stages having at least one stage including said cyclic sensitivity control, an automatic volume control, and means for applying said automatic volume control to the later stages of said receiver.

6. In a receiver for receiving pulses of radio frequency energy reflected from a reflecting object which pulses have been periodically radiated toward said object, means for controlling the sensitivity of said receiver, means operable upon said controlling means cyclically and in synchronism with said radiated pulses for varying said sensitivity gradually in value over an interval falling within the period between the termination of a radiated pulse and the start of the next successive radiated pulse, said sensitivity varying means thereby varying the sensitivity of said receiver from a comparatively low value at the time immediately following a pulse radiation to a comparatively high value at a later time during said period, and wherein said receiver comprises a plurality of stages having at least one stage including said cyclic sensitivity control, an automatic volume control, and means for applying said automatic volume control to said receiver.

ROGERS M. SMITH.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 1,979,225 | Hart | Oct. 30, 1934 |
| 1,982,271 | Turner | Nov. 27, 1934 |
| 1,993,326 | Hart | Mar. 5, 1935 |
| 2,009,459 | Turner | July 30, 1935 |
| 2,055,883 | Terry | Sept. 29, 1936 |
| 2,143,035 | Smith | Jan. 10, 1939 |
| 2,153,760 | Kimball | Apr. 11, 1939 |
| 2,167,492 | Sproule | July 25, 1939 |
| 2,329,570 | Wellenstein | Sept. 14, 1943 |
| 2,403,622 | Tuska | July 9, 1946 |
| 2,407,198 | Wolff | Sept. 3, 1946 |